Jan. 12, 1937.  A. R. SWANSTROM  2,067,427
HORSESHOE
Filed April 3, 1933   2 Sheets-Sheet 1

INVENTOR
ARTHUR R. SWANSTROM
By Paul, Paul & Moore
ATTORNEYS

Jan. 12, 1937.                A. R. SWANSTROM                2,067,427
                                 HORSESHOE
              Filed April 3, 1933                     2 Sheets-Sheet 2
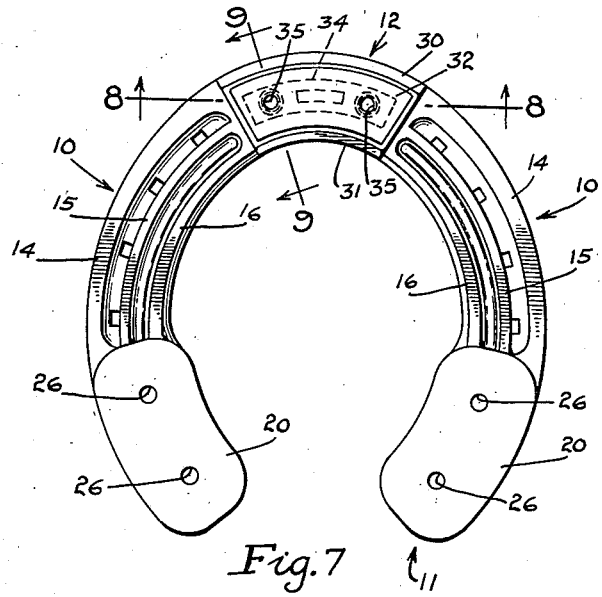
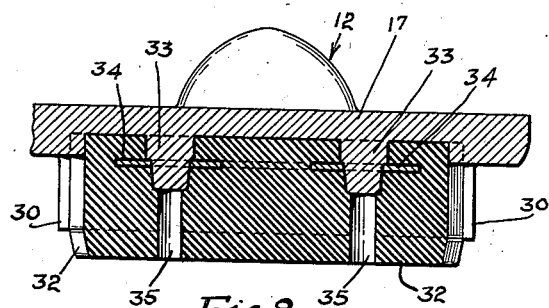
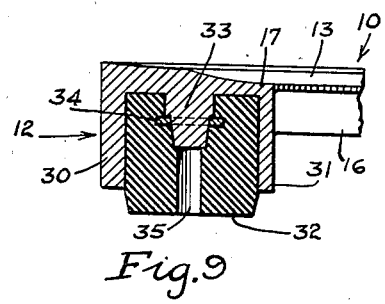
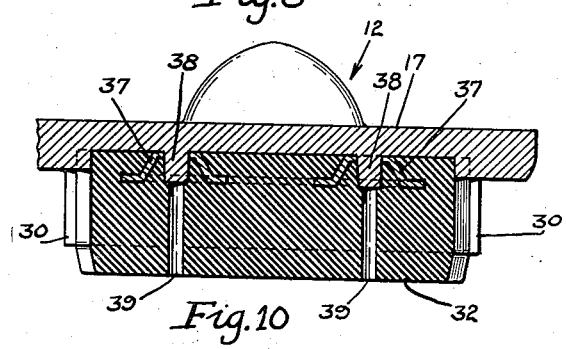
INVENTOR.
ARTHUR R. SWANSTROM
BY Paul, Paul & Moore
ATTORNEYS.

Patented Jan. 12, 1937

2,067,427

UNITED STATES PATENT OFFICE 2,067,427

HORSESHOE

Arthur R. Swanstrom, Duluth, Minn.

Application April 3, 1933, Serial No. 664,242

10 Claims. (Cl. 168—13)

This invention relates to a new and improved horseshoe, especially adapted for use by draft horses that are required to travel on hard pavements, and aims to provide a shoe which will combine great strength with light weight.

Another object of the invention is to provide a horseshoe so designed and constructed as to reduce strains and stresses and to take the wear off the heel.

Another object is to provide a horseshoe having sides of sufficient thickness to give the necessary strength to the shoe but in which the toe portion is of reduced thickness and hence of lighter weight.

Still another object of the invention is to provide a horseshoe so constructed as to aid and facilitate the proper insertion of the nails when the shoe is being attached.

A further object is to provide a metal horseshoe with calks of compressible material which may be easily attached to the shoe.

In general, the invention aims to improve numerous details of construction of horseshoes with the foregoing objects in mind. The advantages of the invention will be brought out more fully as the description proceeds.

In the accompanying drawings, I have shown a practical embodiment of my invention. These drawings are submitted for purposes of illustration and it is to be understood that I do not limit myself to the details of construction therein shown, except as set out in the appended claims.

Figure 1:
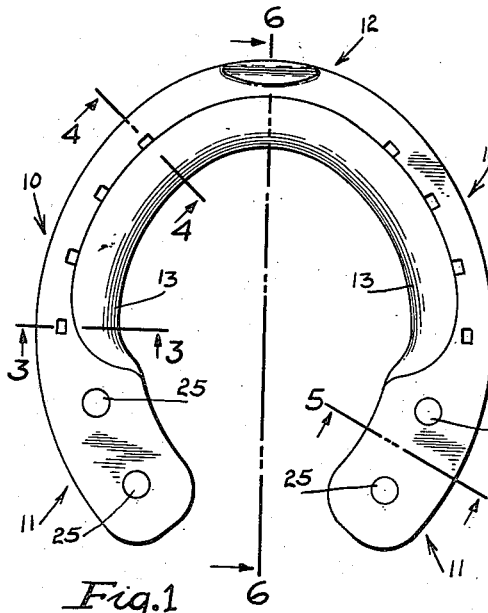
Figure 1 is a plan view of the top or attaching surface of a horseshoe embodying my invention.
Figure 3:
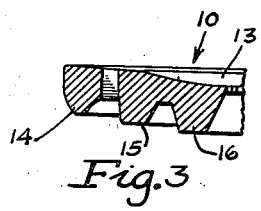
Figure 5:
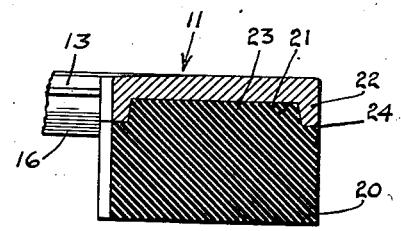
Figure 4:
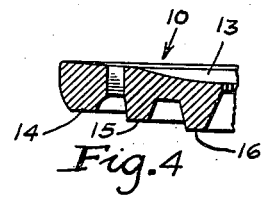
Figure 6:
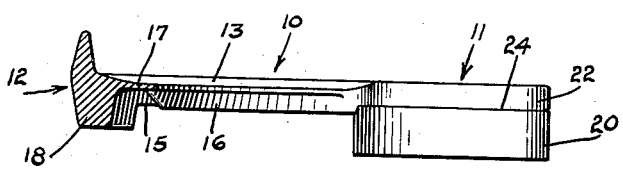

Figures 3, 4 and 5 are views in cross-section taken on lines 3—3, 4—4, and 5—5 of Figure 1, respectively;

Figure 6 is a sectional view on line 6—6 of Figure 1;

Figure 7 is a plan view of the bottom of a horseshoe similar to that shown in Figure 1 and in which the shoe is also provided with a compressible toe calk;

Figures 8 and 9 are views in cross-section taken on lines 8—8 and 9—9 of Figure 7, respectively; and Figure 10 is a view in cross-section similar to Figure 8 showing a modified means for attaching the toe calk to the shoe.

Referring now to the drawings, the horseshoe of my invention comprises side members 10 terminating in spaced heel portions 11 and meeting to form a toe portion 12. The shoe is made of relatively flat metal and is provided upon its attaching surface, as shown in Figure 1, with a concave portion 13 which lies against the tender part of the horse's hoof and serves to relieve any unnecessary pressure thereon.

Upon the bottom surface of the side members of the shoe, I have provided a plurality of reenforcing ribs 14, 15, and 16. By reference to the sectional views Figures 3 and 4, it will be seen that the said ribs are of different vertical depths increasing successively from the outer to the inner rib and that the bottom surfaces of the ribs are at different vertical distances from the top surfaces of the shoe. From rib 14 inwardly these distances are successively greater. This arrangement of the reenforcing ribs upon the sides of the shoe lends it strength and rigidity without materially increasing the weight of the shoe. Indeed, a shoe constructed as thus far described may be made of considerably lighter weight than most horseshoes now available.

While the ribs 15 and 16 are shown in the drawings to be of relatively different thickness, this is not essential for the purposes of my invention and they may be made of the same thickness or depth. However, I have discovered a very useful function in the arrangement whereby the rib 14, which is on the outer edge of the shoe, is made of less thickness or depth than the adjacent ribs. By this arrangement, the horseshoe nails may be given the proper pitch when the shoe is being attached. Thus, the arrangement of the ribs 14 and 15 provides a guide for the proper insertion of the nails.

Figure 2:
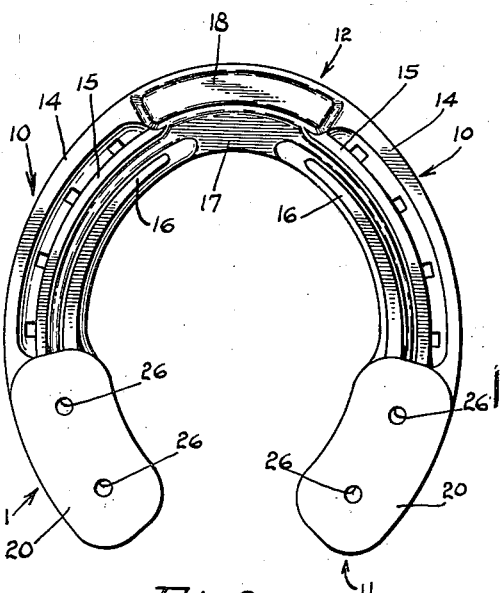
Figure 2 is a plan view of the bottom of the said shoe.

As will be noted from an inspection of Figure 2, the reenforcing ribs terminate adjacent the toe portion of the shoe and leave a relatively thin web of metal 17. The toe may be provided with a suitable metal calk 18, as shown in Figure 2 or, as hereinafter described, the toe may be provided with a compressible calk.

The heel ends of the shoe are provided with compressible calks 20 which may be made of rubber or other suitable composition. A particular feature of my invention resides in the manner of attaching these calks to the heels of the shoe. Heretofore, so far as I am aware, rubber calks have been provided with metallic holders or supporting shanks which have been screwed or wedged into suitable openings in the heel ends.

According to my invention, the heel ends are hollowed out to form a recess 21 surrounded by a flange 22 which is an integral part of the metal of the shoe. The compressible calk 20 is provided with a projecting portion 23 which seats in the recess 21, the said projecting portion terminating inwardly of the outer edge of the calk to provide a peripheral shoulder 24 which seats upon the flange 22. In this arrangement, as will be seen from Figure 5, the exterior surface of the calk 20 is flush with and forms a continuation of the exterior surface of the flange 22.

Any suitable means may be employed for securing the calks 20 to the heel portions of the shoe. In the present case I have shown the calks to be attached by means of rivets 25. Holes 26 extend through the calks 20 so that a suitable tool may be inserted against the ends of the rivets when the said rivets are flattened out on the top of the shoe, as shown in Figure 1.

By hollowing out the heel ends of the shoe in the manner described, the shoe is made considerably lighter at the heel end, and at the same time, a means of securely attaching the calks is provided. It will be understood, however, that it is not essential that the heel ends be provided with the peripheral flange 22. In some cases, it will be sufficient to reduce the thickness of the heel ends and when that is done, a calk having a flat attaching surface may be used and it may be secured to the heel end in the manner described. In either case, the heel ends are reduced in thickness and a calk is provided which fits the outline of the heel.

The foregoing description is directed to a shoe embodying the several new features set forth and which is perfectly satisfactory in use to carry out the objects stated. The shoe construction as herein described is from 25% to 40% lighter than other shoes of the same size intended for the same purpose and this is a considerable advantage. But, despite the lighter weight, a shoe constructed in accordance with my invention will be equally as strong, and in some cases stronger, than other shoes of greater weight.

It may be desirable also to employ a resilient or compressible calk upon the toe of the shoe instead of the metal calk 18 heretofore described. In Figures 7 to 10, inclusive, I have shown a modification of my shoe in which the toe is provided with a compressible calk.

In Figures 7 to 10, inclusive, reference numerals 30 and 31 indicate flanges which are formed on the toe portion 17 of the shoe and so arranged as to hold between them a calk 32 of rubber or other suitable composition. It may be desirable to make the outer flange 30 of somewhat greater thickness than the inner flange 31, as shown, but this is not essential.

The calk 32 may be secured to the toe of the shoe in any desired manner. In Figures 8 and 9, I have shown the toe portion provided with studs 33, preferably formed integral with the toe and extending downwardly therefrom. Within the body of the calk 32, I have located metal locking plates 34 which are provided with an opening so that they may slip over the studs 33. The calk is provided with apertures 35 into which a suitable tool may be inserted so that when the calk is in position, the studs 33 may be slightly deformed in order securely to engage the locking plates 34 and hold the calk in place. In Figure 8, I have shown two separate locking plates 34 but it will be understood that these may be made of one piece.

In Figure 10, I have shown a modification of the means for securing the calk to the toe. In this figure, reference numeral 37 indicates a locking plate of different form from that shown in Figure 8 and which is adapted to surround suitable studs 38 formed integrally with the toe. In this case, also, the calk is provided with apertures 39 through which a suitable tool may be introduced when the calk is assembled on the toe to deform the studs 38 to make the union between the calk and toe permanent.

While I have described several different means for attaching the calks to the shoe, I wish it to be understood that I do not limit my invention to any of these particular means. It will be seen that the calks, both heel and toe, follow the configuration of the shoe and that they are attached directly to the shoe in a manner quite different from that heretofore employed in connection with resilient horseshoe calks.

I claim as my invention:

1. A horseshoe having side members provided with inner and outer reenforcing ribs defining a groove with the bottom of which the nail openings intersect, the inner rib projecting substantially beyond the outer, and having its outer side face flush with the innermost side surfaces of the nail openings, said face being substantially perpendicular to the plane of the top of the shoe.

2. A horseshoe having side members provided with inner and outer reinforcing ribs defining a groove with the bottom of which the nail openings intersect, the inner rib projecting substantially beyond the outer, and having its outer side face flush with the corresponding side surfaces of the nail openings, said face being substantially perpendicular to the plane of the top of the shoe, and the inner face of the outer rib being beveled, the inner end of the bevel intersecting the sides of the openings, and the bevel being at an angle of substantially forty-five degrees to the said outer side face of said inner rib.

3. A horseshoe having a toe, side members and heels, and providing a flat hoof-engaging surface, the ground side of each side member having outer, middle and inner ground-engaging ribs defining two ground-facing channels, the greatest over-all thickness of the heels measured from said flat surface to the ground-facing surface which is nearest the ground being less than the corresponding combined greatest over-all thickness of the side members and ribs.

4. A horseshoe having a toe, side members and heels, and providing a flat hoof-engaging surface, the ground side of each side member having outer, middle and inner ground-engaging ribs defining two ground-facing channels, the greatest over-all thickness of the heels measured from said flat surface being less than the combined greatest over-all thickness of the side members and ribs, each heel being recessed toward said flat surface in a manner to provide marginal flanges, rubber calks having flat ground engaging faces and having portions fitting the recesses and having shoulders engaging and overlapping and completely covering the outer faces of the flanges and having outer and inner and rear end vertical surfaces flush and coplanar with the corresponding surfaces of the heels, and means securing said calks in the recesses.

5. A horseshoe having a toe, side members and heels, and providing a flat hoof-engaging surface, the ground side of each side member having outer, middle and inner ground-engaging ribs defining two ground facing channels, the front portion of said toe having an integral transversely elongated narrow calk, and the rear portion of the toe inwardly from the calk and of about the same transverse length as the calk having a greatest over-all thickness substantially less than that of the ribs, as measured from said flat surface, the forward ends of the inner ribs being spaced apart and merging integrally into said thin toe portion, the forward ends of the outermost and middle ribs merging integrally into end portions of the toe calk.

6. A horseshoe having a toe, side members and heels, and providing a flat hoof-engaging surface, the ground side of each side member having outer, middle and inner ground-engaging ribs defining two ground facing channels, the greatest over-all thickness of the heels measured from said flat surface being less than the combined greatest over-all thickness of the side members and ribs, the front portion of said toe having an integral transversely elongated calk, and the rear portion of the toe inwardly from the calk and of the same transverse length as the calk having a greatest over-all thickness substantially less than the ribs as measured from said coplanar surface, each heel being recessed toward said flat surface in a manner to provide marginal flanges, rubber calks having flat ground-engaging faces and having portions fitting the recesses and having shoulders engaging and overlapping and completely covering the outer faces of the flanges and having outer and inner and rear end vertical surfaces of the calks flush and coplanar with the corresponding surfaces of the heels and means securing said calks in the recesses, the forward ends of the innermost ribs being spaced apart and merging into said thin toe portion, the forward ends of the outermost and middle ribs merging into end portions of the toe calk.

7. A horseshoe having side members provided with a hoof-engaging surface and having light weight side members having ground-facing reenforcing ribs, said shoe also having light weight heel portions each having a recess for receiving a calk, the greatest over-all thickness of each heel portion measured from the flat hoof-engaging surface to the ground-facing surface which is nearest the ground being less than the greatest over-all thickness of the side members and their ribs, and a resilient calk secured in each recess of each heel portion.

8. A horseshoe having side members provided with a hoof-engaging surface, and having side members having ground-facing reenforcing ribs, and having a toe calk which occupies only the outer portion of the toe, the inner part of the toe having a substantial area with an over-all thickness from the hoof-engaging surface to that part of the ground-facing surface which is nearest the ground substantially less than the greatest combined corresponding over-all thickness of the side members and their ribs, said shoe also having heel portions each having a recess for receiving a calk the greatest over-all thickness of each heel portion measured from the hoof-engaging surface to the ground-facing surface which is nearest the ground being less than the greatest over-all thickness of the side members and its ribs, and resilient calks secured in said recesses of said heel portions.

9. A horseshoe having side members provided with inner middle and outer reenforcing ribs, the inner rib projecting substantially beyond the middle rib in direction of the ground and the middle rib projecting substantially beyond the outer rib in direction of the ground, the reenforcing ribs defining relatively wide grooves with the bottom of one of which nail openings intersect, said shoe having a flat hoof-engaging surface and having heel portions the greatest over-all thickness of which as measured from said flat surface to the surface nearest the ground is less than the corresponding combined greatest over-all thickness of the side members and ribs, and a resilient calk secured to each heel portion, said shoe having a toe calk the ground-engaging surface of which is a lesser distance from said hoof-engaging surface than the ground-engaging surface of the heel calks.

10. A horseshoe having side members provided with inner middle and outer reenforcing ribs the inner rib projecting substantially beyond the middle rib in direction of the ground and the middle rib projecting substantially beyond the outer rib in direction of the ground, the reenforcing ribs defining relatively wide grooves with the bottom of one of which the outer nail openings intersect, said shoe having a flat hoof-engaging surface and having recessed heel portions the greatest over-all thickness of each of which as measured from said flat surface to the surface nearest the ground is less than the combined corresponding over-all thickness of the side members and ribs.

ARTHUR R. SWANSTROM.